(12) United States Patent
Lemmers, Jr. et al.

(10) Patent No.: US 8,561,503 B2
(45) Date of Patent: Oct. 22, 2013

(54) MOTOR-GENERATOR AND PRIME MOVER GEARING ASSEMBLY

(75) Inventors: Glenn C. Lemmers, Jr., Loves Park, IL (US); David S. Behling, Belvidere, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/192,526

(22) Filed: Jul. 28, 2011

(65) Prior Publication Data

US 2013/0025406 A1 Jan. 31, 2013

(51) Int. Cl.
*F16H 47/00* (2006.01)
(52) U.S. Cl.
USPC .......................................................... 74/733.1
(58) Field of Classification Search
USPC .................................. 74/730.1, 732.1, 733.1
See application file for complete search history.

(56) References Cited

U.S. PATENT DOCUMENTS

| | | | |
|---|---|---|---|
| 3,286,543 A | 11/1966 | Porter | |
| 3,367,109 A | 2/1968 | Troeger et al. | |
| 3,722,324 A * | 3/1973 | Cordner et al. | 475/75 |
| 3,786,696 A * | 1/1974 | Aleem | 475/77 |
| 3,838,779 A | 10/1974 | Dawson | |
| 4,315,442 A | 2/1982 | Cordner | |
| 4,382,188 A | 5/1983 | Cronin | |
| 4,724,331 A | 2/1988 | Nordlund | |
| 4,817,459 A | 4/1989 | Erikson et al. | |
| 5,028,803 A | 7/1991 | Reynolds | |
| 6,838,778 B1 | 1/2005 | Kandil et al. | |
| 6,880,429 B1 | 4/2005 | Daniel et al. | |
| 7,434,406 B2 | 10/2008 | Herlihy et al. | |
| 2004/0159108 A1* | 8/2004 | Lee | 60/804 |
| 2006/0034693 A1* | 2/2006 | Lardellier | 416/170 R |
| 2011/0225978 A1* | 9/2011 | Behling et al. | 60/788 |

* cited by examiner

*Primary Examiner* — Ha D Ho
(74) *Attorney, Agent, or Firm* — Carlson, Gaskey & Olds P.C.

(57) ABSTRACT

An example mechanical transmission assembly receives an input rotating at a first rotational speed and provides an output rotating at a second rotational speed. The mechanical transmission selectively adjusts the second rotational speed. The input is provided by a prime mover. The output is provided to a hydraulic pump assembly that rotatably drives a motor-generator.

13 Claims, 4 Drawing Sheets

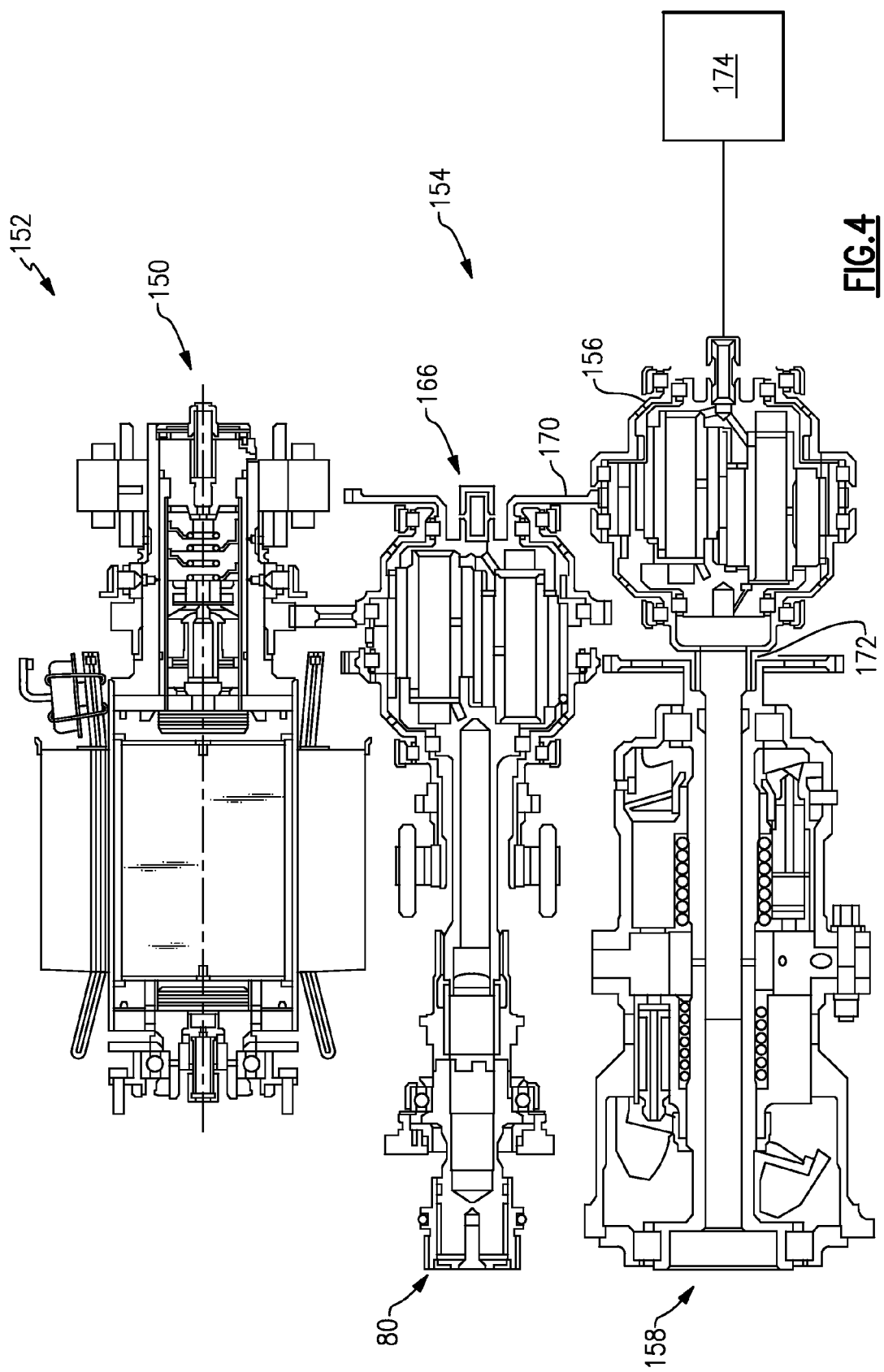

MOTOR-GENERATOR AND PRIME MOVER GEARING ASSEMBLY

BACKGROUND

This disclosure relates generally to a gearing assembly that rotatably couples a prime mover and a motor-generator.

Prime movers, such as turbomachines, are known. A typical turbomachine includes a fan section, a compression section, a combustor section, and a turbine section. Turbomachines have at least one rotor in the compression section. The rotor must be accelerated to a relatively high rotational speed until the rotor is rotating fast enough to sustain operation of the turbomachine.

A motor-generator, separate from the turbomachine, is used as a motor to rotate the rotor during start-up of the turbomachine. After the turbomachine is self-sustaining, the motor-generator is used as a generator and driven by the turbomachine.

The rotational speeds of prime movers may be different than the optimal speed of the motor-generator. Also, the rotational speeds vary considerably during operation, and it is desirable to provide the motor-generator with a rotational input that is relatively consistent. Hydro-mechanical transmissions are thus used to step-up or step-down rotation between the prime mover and the motor-generator. The size and weight of the hydro-mechanical transmissions must increase to accommodate larger ranges of rotational speeds.

SUMMARY

An example mechanical transmission assembly receives an input rotating at a first rotational speed and provides an output rotating at a second rotational speed. The mechanical transmission selectively adjusts the second rotational speed. The input is provided by a prime mover. The output is provided to a hydraulic pump assembly that rotatably drives a motor-generator.

An example prime mover gearing arrangement includes a hydro-mechanical transmission having a differential assembly and a hydraulic pump. A motor-generator is rotatably driven by the hydro-mechanical transmission. A mechanical transmission is rotatably driven by the prime mover at a first rotational speed. The mechanical transmission selectively adjusts to rotatably drive the hydraulic pump at the first rotational speed or a second rotational speed different than the first rotational speed.

An example method of driving a motor-generator with a prime mover includes driving a mechanical transmission with an input shaft from a prime mover. The input shaft rotates at a first rotational speed. The method drives a hydraulic pump with a first output shaft from the mechanical transmission. The first output shaft rotates at a second rotational speed. The method drives the motor-generator with the hydraulic pump. The method selectively adjusts the mechanical transmission so that the first rotational speed is different than the second rotational speed.

BRIEF DESCRIPTION OF THE DRAWINGS

These and other features of the disclosed examples can be best understood from the following specification and drawings, the following of which is a brief description:

FIG. 4 shows another example gearing arrangement suitable for use with the FIG. 1 turbomachine and motor-generator.

DETAILED DESCRIPTION

Figure 1:
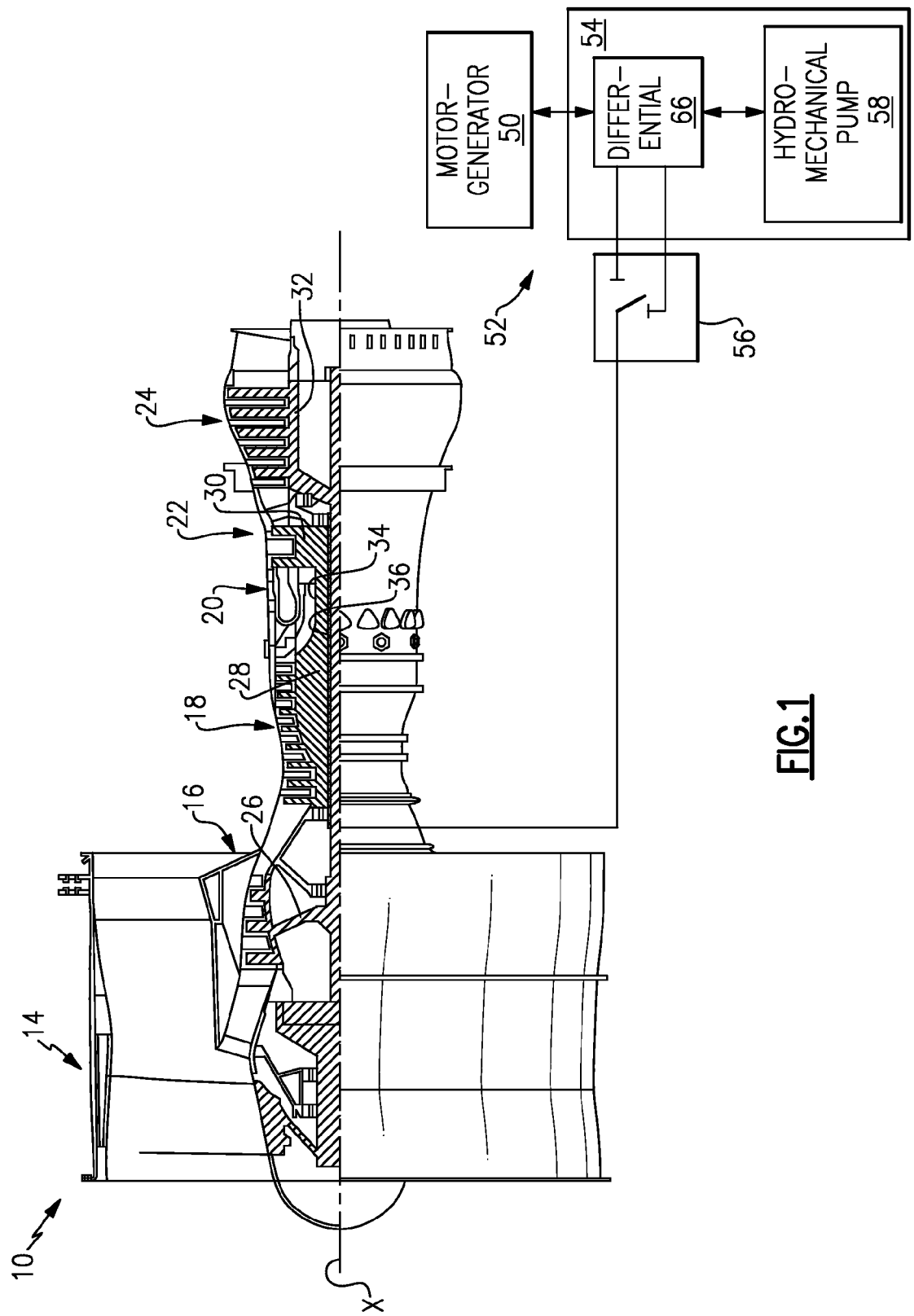
FIG. 1 shows schematic view of an example turbomachine, motor-generator, and gearing arrangement.
Figure 2:
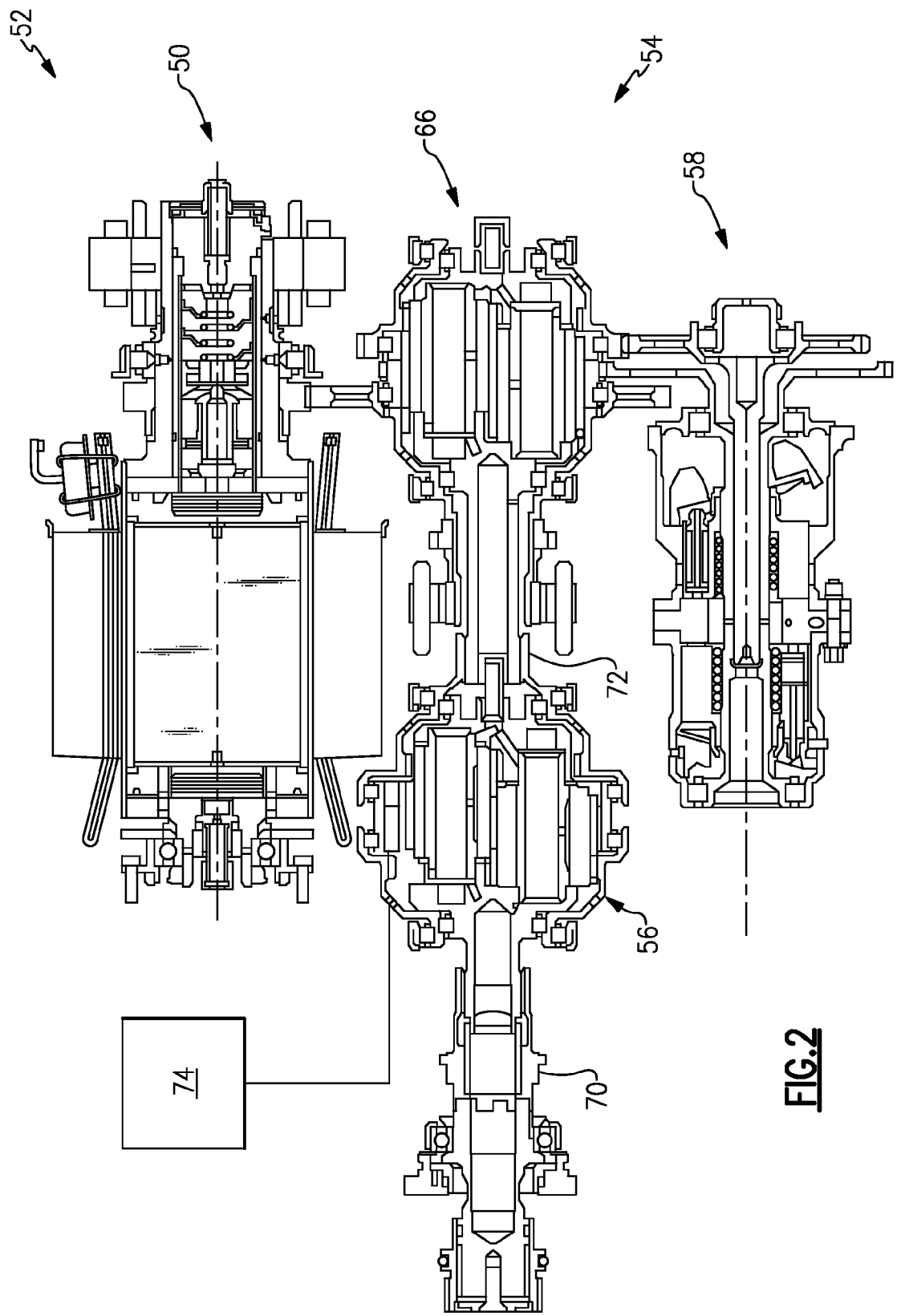
FIG. 2 shows a more detailed view of the FIG. 1 gearing arrangement.

Referring to FIGS. 1 and 2, an example gas turbine engine 10 is used to propel an aircraft. The gas turbine engine 10 is an example type of turbomachine, which is an example type of prime mover.

The gas turbine engine 10 is circumferentially disposed about an axis X. The gas turbine engine 10 includes a fan section 14, a low-pressure compressor section 16, a high-pressure compressor section 18, a combustion section 20, a high-pressure turbine section 22, and a low-pressure turbine section 24. Other example turbomachines may include more or fewer sections.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The low-pressure compressor section 16 includes a rotor 26. The high-pressure compressor section 18 includes a rotor 28. The example rotors 26 and 28 include alternating rows of rotating airfoils or rotating blades and static airfoils or static blades.

The high-pressure turbine section 22 includes a rotor 30. The low-pressure turbine section 24 includes a rotor 32. The rotors 30 and 32 are configured to rotate about the axis X in response to expansion across the high-pressure turbine section 22 and the low-pressure turbine section 24. The example rotors 30 and 32 include alternating rows of rotatable airfoils or rotatable blades and static airfoils or static blades.

The rotor 30 is coupled to the rotor 28 through a high-pressure spool 34. The rotor 32 is coupled to the rotor 26 through a low-pressure spool 36. Thus, rotation of the rotors 30 and 32 rotates the rotors 28 and 26, which drives compression in the high-pressure compressor section 18 and the low-pressure compressor section 16, respectively. During operation of the gas turbine engine 10, the low-pressure spool 36 rotates across a greater range of rotational speeds than the high-pressure spool 34.

Although the examples of a prime mover in this disclosure are described with reference to the gas turbine engine 10 that has a two-spool architecture, the examples are not limited to such architectures. That is, other types of turbomachines, and gas turbine engines having other architectures, such as a single-spool axial design, a three-spool axial design, may be used, as well as other prime movers, such as a piston engine, wankel engine, etc. There are various arrangements having prime movers that could benefit from the examples disclosed herein.

In this example, the low-pressure spool 36 drives a motor-generator 50 when the motor-generator 50 is operating in a generator mode. The low-pressure spool 36 may drive the motor-generator 50 instead of, or in addition to, the high-pressure spool 34. When operating in the generator mode, the motor-generator 50 provides electrical power to various loads on the aircraft. The motor-generator 50 is typically required to provide power at a relatively constant frequency, or to ensure that the delivered power varies within a range of frequencies, such as 360-800 Hertz.

The rotational speed of the low-pressure spool 36 varies considerably during operation of the gas turbine engine 10. The range of potential rotational speeds for the low-pressure spool 36 is greater than the range of potential speeds for the high-pressure spool 34. A gearing arrangement 52 accommodates the variation in rotational speeds from the low-pressure spool 36 and rotatably drives the motor-generator 50. In the prior art, the high-pressure spool 34 is typically used to drive the motor-generator 50.

The example gearing arrangement 52 includes a hydro-mechanical transmission 54 and a mechanical transmission 56 separate from the hydro-mechanical transmission 54. The hydro-mechanical transmission 54 is constantly variable and includes a hydraulic pump 58 and a differential 66.

In this example, the mechanical transmission 56 is configured to be selectively adjusted between a first position and a second position. In the first position, the mechanical transmission 56 rotates the differential 66 at the same speed as the low-pressure spool 36. In the second position, the mechanical transmission 56 rotates the differential 66 faster than the low-pressure spool 36. The example mechanical transmission 56 is a two-speed transmission. In other examples, the mechanical transmission 56 may adjust between three-speeds, or even more speeds.

In one specific example, when the mechanical transmission 56 is in the first position, the differential 66 is rotated at 4,000 rpm when the low-pressure spool 36 rotates at 2,000 rpm. In this specific example, when the mechanical transmission 56 is in the second position, the differential 66 rotates at 4,000 rpm when the low-pressure spool 36 rotates at 4,000 rpm. The hydraulic pump 58 may further adjust the rotational speed. The hydraulic pump 58 rotates the motor-generator 50 through the differential 66.

The example mechanical transmission 56 receives a rotational input from the low-pressure spool 36 through an input 70, which is an input shaft in this example. In one example, the rotational speed of the input 70 can vary during operation of the gas turbine engine 10 between a high speed that is five times greater than a low speed. For example, during operation of the gas turbine engine 10, the input 70 may rotate at 5,000 rpm at a high end and 1,000 rpm at a low end.

The input 70 is directly engaged with the mechanical transmission 56 in this example. The mechanical transmission 56 then provides a rotational output via an output 72, which is also directly engaged with the mechanical transmission 56. The output 72 is a differential ring gear in this example.

The example mechanical transmission 56 moves from a position where the output 72 rotates at the same speed as the input 70, and another position where the output 72 rotates twice for every single rotation of the input 70.

The example mechanical transmission 56 includes a sunless differential gearing arrangement. The example mechanical transmission 56 is similar in design to the differential 66. A person having skill in this art and the benefit of this disclosure would understand how to design other types of mechanical transmissions movable between a position where the input and output rotate at the same speed, and a second position where the output rotates twice as fast as the input.

The mechanical transmission 56 is connected to a controller 74. During operation of the gas turbine engine 10, the controller 74 initiates movement of the mechanical transmission 56 between the first position and the second position depending on the rotational speed of the low-pressure spool 36. The controller 74 may monitor the rotational speed of the low-pressure spool 36 to determine when to initiate movement between the first position and the second position. The controller 74 may automatically initiate movement, or may require a manual input, such as a switch.

Figure 3:
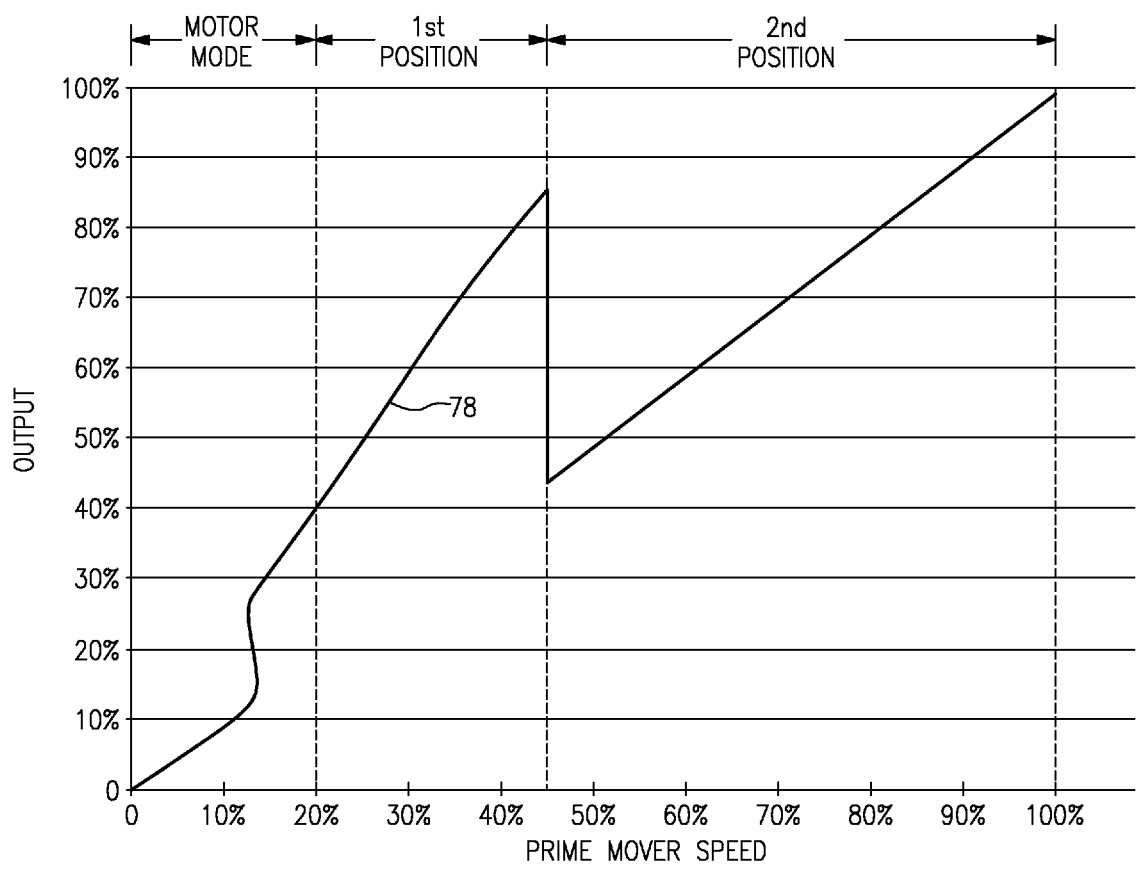
FIG. 3 shows a graph depicting example rotational speed relationships when utilizing the FIG. 1 gearing arrangement.

For example, referring to FIG. 3 with continuing reference to FIGS. 1 and 2, the controller 74 may maintain the mechanical transmission 56 in the first position as the rotational speed of the low-pressure spool 36 increases from about 20% to 45% of the total potential speed of the low-pressure spool 36 along a path 78. In this example, 20% of the total potential speed is about 2,000 rpm and 45% of the total potential speed is about 4,000 rpm. When the low-pressure spool 36 reaches 45% of its total potential speed, the controller 74 moves the mechanical transmission 56 to the second position where the input 70 rotates together with the output 72. Other examples may move the mechanical transmission to a third position.

In this example, the output 72 rotates the differential 66, which then provides a rotational input to the hydraulic pump 58. The hydraulic pump 58 further adjusts the rotational speeds to ensure that the motor-generator 50 provides a relatively consistent output. The hydraulic pump 58 rotatably drives the motor-generator 50 through the differential 66.

Notably, in this example, the hydraulic pump 58 always receives an input that is greater than 4,000 rpm, even when the low-pressure spool 36 is rotating at a speed slower than 4,000 rpm. The mechanical transmission 56, in such an example, ensures that the rotational speed from the differential 66 is maintained above 4,000 rpm.

In other examples, the hydraulic pump 58 receives an input rotating at 4,000 rpm or less. The input speed is optimized for the hydraulic pump 58.

Referring to FIG. 4 with continuing reference to FIG. 1, another example gearing arrangement 152 includes a mechanical transmission 156, a differential 166, and a hydraulic pump 158. The numbering used in FIG. 4 corresponds to the numbering in FIG. 3 with a preappended "1."

In this example, an input 170 is provided to the mechanical transmission by the differential 166. The differential 166 is rotated by a shaft 80 coupled to the low-pressure spool 36. The mechanical transmission 156 then is selectively moved between two positions to rotate the hydraulic pump 158 at the desired speed. A controller 174 may be used to control the movement of the mechanical transmission 156 between the first position and the second position.

An output 172, in this example, is an output shaft extending directly from the mechanical transmission 156 to the hydraulic pump 158. The output 172 rotates the mechanical transmission 156. The hydraulic pump 158 then rotates the motor-generator 150 through the differential 166.

Features of the disclosed examples include a gearing arrangement capable of receiving an input from a low-pressure spool of a turbomachine and providing rotational input to a motor-generator.

Although an example embodiment has been disclosed, a worker of ordinary skill in this art would recognize that certain modifications would come within the scope of the claims. For that reason, the following claims should be studied to determine their true scope and content.

We claim:

1. A mechanical transmission assembly, comprising:
   a mechanical transmission that receives an input rotating at a first rotational speed and provides an output rotating at a second rotational speed, the mechanical transmission selectively adjusting the second rotational speed, wherein the input is provided by a prime mover, and the output is provided to a hydraulic pump assembly that rotatably drives a motor-generator, wherein the mechanical transmission receives the input rotating at the first rotational speed and provides an output rotating at a third rotational speed, the third rotational speed different than the first rotational speed and the second rotational speed.

2. The mechanical transmission assembly of claim 1, wherein the input is provided by a low-pressure spool of the prime mover.

3. The mechanical transmission assembly of claim 1, wherein the input is provided by an input shaft extending from the prime mover directly to the mechanical transmission.

4. The mechanical transmission assembly of claim 1, wherein a rotational speed of the input varies between a highest speed and a lowest speed, the highest speed at least five times greater than the lowest speed.

5. The mechanical transmission assembly of claim 1, wherein the mechanical transmission is a two-speed transmission.

6. The mechanical transmission assembly of claim 1, wherein the output from the mechanical transmission is provided directly to the hydraulic pump.

7. The mechanical transmission assembly of claim 1, wherein the output from the mechanical transmission is provided to the hydraulic pump assembly though a differential that rotatably couples the hydraulic pump to the motor-generator.

8. The mechanical transmission assembly of claim 1, wherein the mechanical transmission comprises a sunless differential.

9. The mechanical transmission assembly of claim 1, wherein the mechanical transmission is configured to be adjusted between a first position and a second position, the first rotational speed the same as the second rotational speed when the mechanical transmission is in the first position, the first rotational speed is equal to half or less of the second rotational speed when the mechanical transmission is in the second position.

10. The mechanical transmission assembly of claim 1, wherein the prime mover is a turbomachine.

11. The mechanical transmission assembly of claim 1, wherein the input is a single input.

12. A mechanical transmission assembly, comprising:
a mechanical transmission configured to be rotatably driven by a prime mover at a first rotational speed, the mechanical transmission selectively adjustable to provide a rotatable output that drives a hydraulic pump at the first rotational speed or a second rotational speed different than the first rotational speed, wherein the mechanical transmission is further selectively adjustable to rotatably drive the hydraulic pump at a third rotational speed that is different than both the first rotational speed and the second rotational speed.

13. The mechanical transmission assembly of claim 12, wherein the hydraulic pump is configured to rotatably drive a motor-generator.

* * * * *